Oct. 10, 1933.  L. H. FITCH, JR  1,929,841
ABSORPTION SYSTEM
Filed Dec. 7, 1931
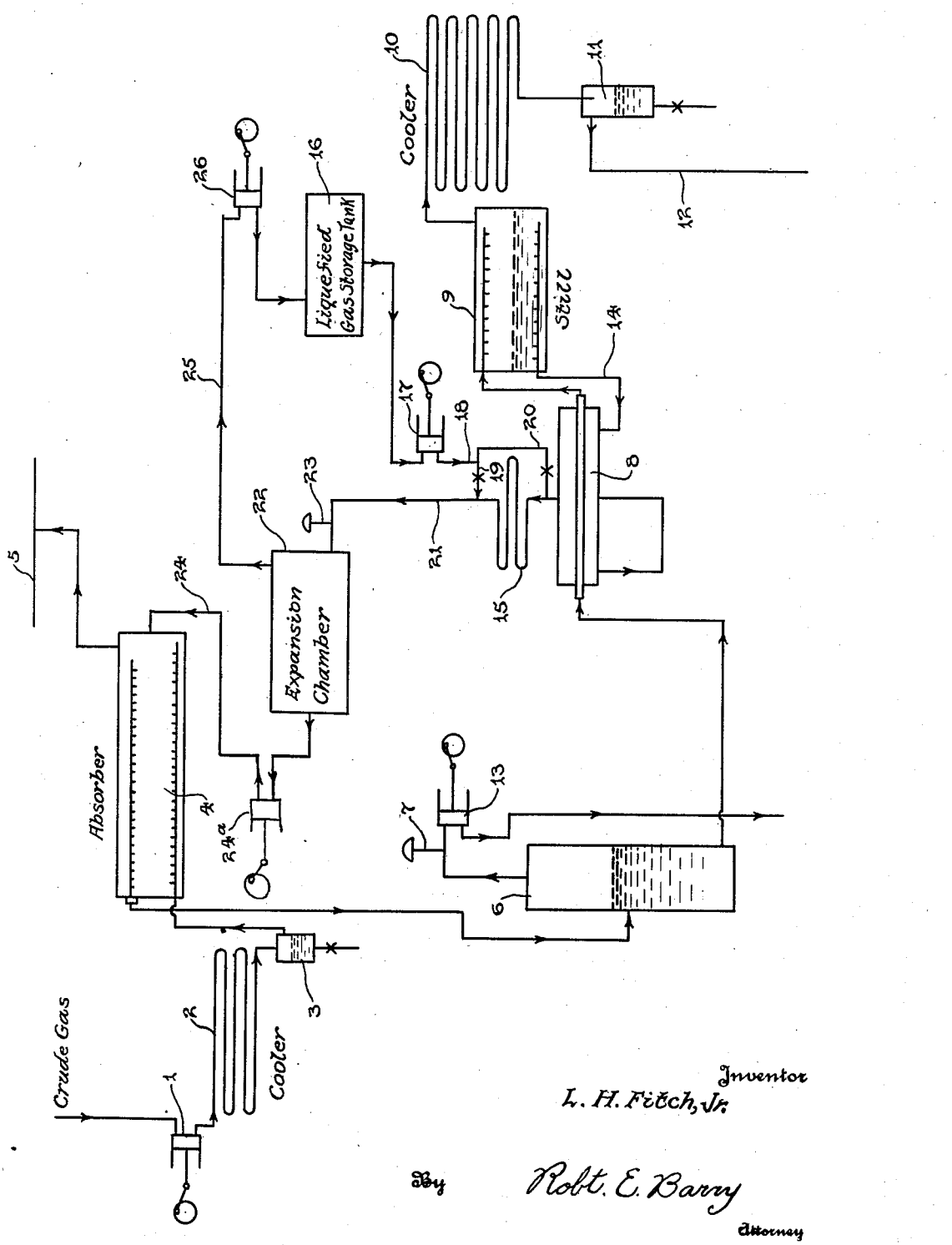
Inventor
L. H. Fitch, Jr.
By Robt. E. Barry
Attorney Patented Oct. 10, 1933

1,929,841

UNITED STATES PATENT OFFICE 1,929,841

ABSORPTION SYSTEM

Louis H. Fitch, Jr., Bartlesville, Okla., assignor to Phillips Petroleum Company, Bartlesville, Okla., a corporation of Delaware Application December 7, 1931. Serial No. 579,571

6 Claims. (Cl. 62—179)

This invention relates to the absorption of vapors from gases, and while generically directed to the chilling of the absorbent menstruum used in such systems, is more particularly directed to the chilling of the absorbent oil employed in extracting hydrocarbon vapors from gases.

This process for the absorption of hydrocarbon vapors, includes mixing with an absorbent oil appreciable quantities of liquefied hydrocarbon gases such as ethane, propane or butane, or any mixture of these constituents; reducing the pressure on the mixture of absorbent oil and liquefied gases, so as to allow the latter to evaporate and thus to cool or refrigerate the absorption oil before the oil is contacted with hydrocarbon gases in the conventional absorption system. This process results in improved absorption of the heavier hydrocarbons from the gas, due to the refrigeration of the absorption oil, and due also to the fact that the oil will not heat to as high a degree during its passage through an absorber by the latent heat of absorption of the hydrocarbons absorbed by the oil.

One of the objects of the invention is to maintain a cycle of liquefied petroleum gas (preferably propane) in the denuded oil of a typical oil absorption plant. The liquefied gas may be forced into the cool denuded oil leaving the conventional heat exchanger, or it can be forced into the cooler denuded oil leaving the ordinary oil cooling coils. This mixing is accomplished under sufficient pressure so that the liquefied gas remains in solution almost completely until the mixture reaches an expansion chamber, where a lower pressure permits all of the liquefied gas to leave the denuded oil. Of course, in vaporizing or returning to gaseous condition, the cooling agent will cool the denuded oil. My improved system is especially useful where cooling water problems are serious, and it is obvious that by proper control, a constant oil temperature may be maintained throughout the year, and this temperature will be lower than can otherwise be obtained.

It has heretofore been proposed to put liquefied petroleum gas into the raw gas, or into the absorption oil during the absorption stage of the process. Except for the cooling obtained by the vaporization, such a procedure is unsound. In contradistinction to these prior proposals, I put the liquefied petroleum gas into the denuded oil and remove it from the latter prior to the absorption stage.

With the foregoing objects outlined and with other objects in view which will appear as the description proceeds, the invention consists in the novel features hereinafter described in detail, illustrated in the accompanying drawing, and more particularly pointed out in the appended claims.

The drawing shows a diagrammatic view of a conventional absorption system equipped with my improvements.

A typical natural gas gasoline process will now be described in connection with this drawing, and the manner in which the process of my invention may be applied thereto will be indicated.

Gas from the wells is subjected to a suitable pressure by means of a compressor 1, and then cooled in a cooler 2. The heavier hydrocarbons present, usually contaminated by lubricating oil, will be thus condensed and withdrawn through the tank 3 for further treatment. The gas, still under pressure, is then passed to the absorber 4, where it is brought into contact with the absorbent oil. The undissolved gas is passed from the absorber to the main 5, while the oil with its dissolved hydrocarbons flows to a vent tank 6 where the pressure on the oil is released by a suitable regulator 7. One or more of these vent tanks are usually employed.

From the tank 6, the oil passes to heat exchanger 8 and thence to still 9 where it is blown with live steam, the result being that practically all of the substances remaining in the absorbent oil are expelled. The mixture of steam and hydrocarbons formed in the still passes to a condenser 10 maintained at a temperature somewhat below the boiling point of water. In this condenser, the aqueous vapor is condensed, and is withdrawn through trap 11, but the hydrocarbons remain in vapor state and they pass off through pipe 12 to the conventional condensing means, wherein they are liquefied.

The vent gases from the tank 6 may be compressed by the compressor 13 for the purpose of liquefying the same.

The denuded oil leaves the still through the pipe 14, and is passed to the heat exchanger 8 in which it is partially cooled by the enriched oil as the latter moves from the vent tank to the still. After being partially cooled in the exchanger 8, the denuded oil is usually passed through a cooler 15, and then returned to the absorber 4 where it again acts to absorb vapors from the raw gas.

In accordance with my invention, I further cool the denuded absorbent oil between the heat exchanger and the absorber by the following means. In a suitable pressure tank 16, I store liquefied petroleum gas such as ethane, propane, butane or mixtures thereof, and by means of a pump 17, this liquefied gas is forced into a pipe 18 having valved flanges 19 and 20, the former discharging into the denuded oil conduit 21 posterior to the cooler 15, and the other branch discharging into the conduit anterior to said cooler. Obviously, the liquefied gas may be introduced into the conduit through either one or both of the branches. After the liquefied gas is mixed with the denuded oil in this way, the mixture enters an expansion chamber 22, but before entering the chamber, the pressure is reduced by means of a suitable regulator 23, so that as soon as the mixture is within the chamber, the liquefied gas immediately returns to gaseous condition and thus creates the low temperature employed to refrigerate the denuded oil to a lower temperature than heretofore used. The refrigerated denuded oil is discharged from the expansion chamber by pump 24a through a pipe 24 which returns it to the absorber for reuse therein. Gases are discharged from the chamber through a conduit 25 which leads to a compressor 26 that functions to liquefy these gases and to return them to the chamber 16.

While the invention has been disclosed specifically in connection with a natural gas gasoline absorption system, it is manifest that it may be used in any absorption system where it is of advantage to refrigerate the denuded absorbent liquid before the latter is reintroduced into the absorber, it is also evident that changes may be made in the details disclosed without departing from the spirit of the invention, as expressed in the claims.

What is claimed and desired to be secured by Letters Patent is:

1. In an absorption system employing a liquid absorbent, chilling the denuded absorbent liquid before introducing the same into the absorption chamber by subjecting the absorbent liquid to the action of a normally gaseous refrigerant in direct contact therewith while the latter is expanding from a liquefied to a gaseous condition, then separating said refrigerant from the liquid and introducing the chilled liquid into the absorption chamber.

2. In an absorption system employing a liquid absorbent, subjecting the denuded absorbent to chilling before introducing the same into the absorbent chamber by mixing a liquefied gas with the denuded absorbent, then introducing the mixture into a zone of lower pressure where the gas expands from liquefied to gaseous condition, discharging the gas in gaseous condition from said zone of lower pressure, and then introducing the chilled liquid into the absorption chamber separate from the last mentioned gas.

3. In a method of the character described, circulating a petroleum gas in an enclosed ring, introducing denuded absorbent oil into said ring at one point and discharging the same from the ring at another point, liquefying said gas at a point in the ring and mixing the same in liquid condition with the denuded absorbent which flows through a portion of the ring, reducing the pressure on the mixture and thereby returning the gas to gaseous condition, separating the last mentioned gas from the oil which has been chilled by said expansion, and returning the separated gas to the point at which the gas is liquefied.

4. In an absorption system, a still, an absorber, means for returning denuded absorbent oil from the still to the absorber, and means cooperating with the last mentioned means for introducing liquefied gas into the returning denuded oil for expanding the mixture and for discharging the gas in gaseous condition from the returning oil prior to the reintroduction of the oil into the absorber.

5. An absorption system including an absorber, a still, a conduit for returning denuded absorbent oil from the still to the absorber, means for introducing liquefied petroleum gas into said conduit, means interposed in the conduit posterior to the last mentioned means for releasing the pressure on the mixture, an expansion chamber interposed in said conduit posterior to the pressure reducing means, and means for discharging the gas in gaseous condition from said expansion chamber.

6. An absorption system comprising an absorber, a still, a conduit for returning denuded absorbent oil from the still to the absorber, an expansion chamber interposed in said conduit, a second conduit leading from the expansion chamber to a point in the first conduit anterior to the expansion chamber, gas liquefying means interposed in the second conduit, means interposed in the second conduit for forcing liquefied gas from the second conduit into the first conduit, and a pressure reducing device interposed in the first conduit between the expansion chamber and the point where the second conduit is connected to the first conduit.

LOUIS H. FITCH, Jr.